C. E. LONGDEN.
PROCESS AND APPARATUS FOR FORMING RUBBER ARTICLES.

No. 185,939. Patented Jan. 2, 1877.

WITNESSES:
Francis McArdle
J. H. Scarborough

INVENTOR:
Chas. E. Longden
BY
ATTORNEYS.

UNITED STATES PATENT OFFICE.

CHARLES E. LONGDEN, OF NAUGATUCK, CONNECTICUT.

IMPROVEMENT IN PROCESSES AND APPARATUS FOR FORMING RUBBER ARTICLES.

Specification forming part of Letters Patent No. 185,939, dated January 2, 1877; application filed October 7, 1876.

*To all whom it may concern:*

Be it known that I, CHARLES E. LONGDEN, of Naugatuck, in the county of New Haven and State of Connecticut, have invented a new and Improved Process for Working Rubber, of which the following is a specification:

My invention relates to a process for manufacturing articles from rubber or other vulcanizable substance; and it consists in preparing the rubber or other vulcanizable substance for vulcanizing in the usual manner, and dissolving it in naphtha or other suitable solvent, and dipping the molds or forms upon which the articles are vulcanized into the solution of rubber a number of times, allowing sufficient time after each dipping for the naphtha to evaporate more or less. When the mold or form becomes sufficiently coated with rubber, the articles are allowed to dry on the mold, and are afterward vulcanized in the ordinary way.

The object of this invention is to rapidly and economically manufacture articles from soft rubber which will have a smooth, well-finished surface.

Figure 1:
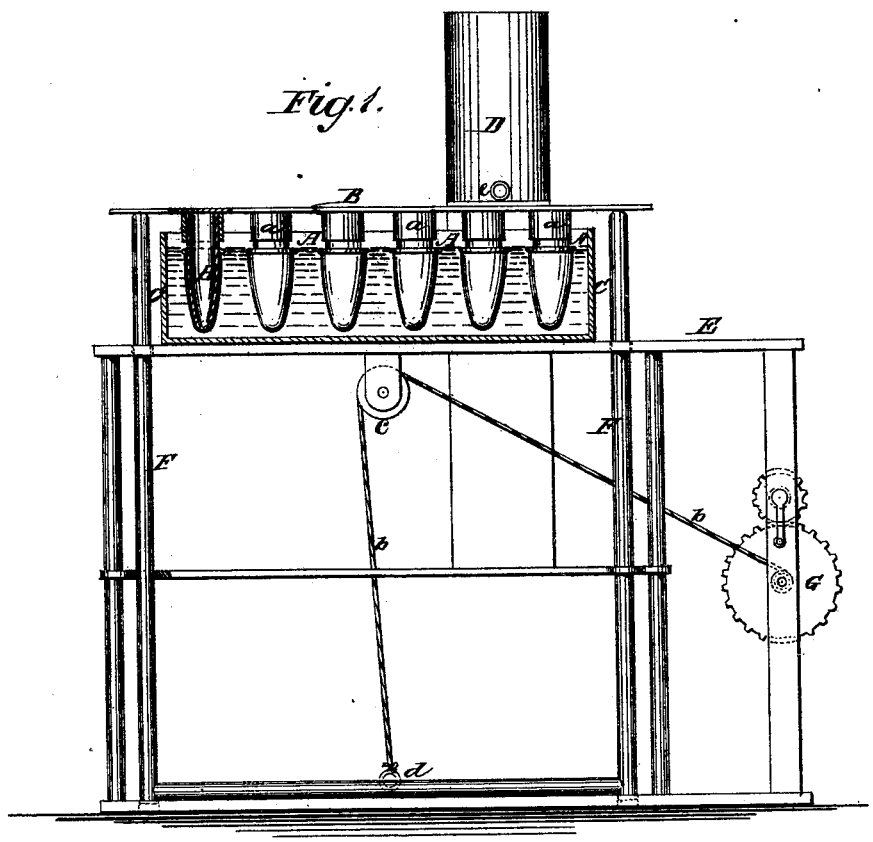
Figure 2:
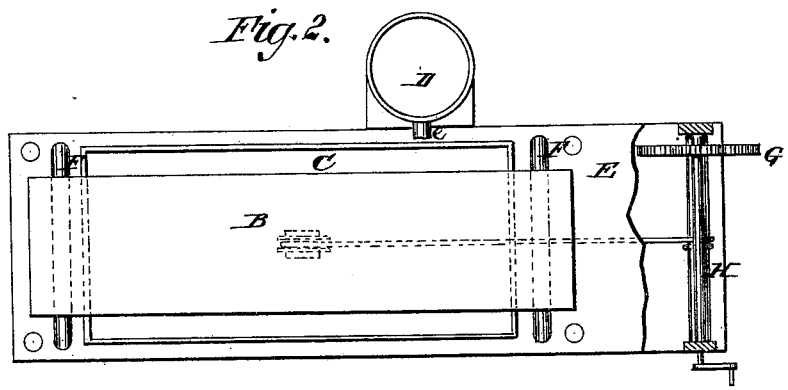

In carrying out my invention I make use of the apparatus shown in part section in Figure 1 in the drawing, and shown in plan in Fig. 2.

Similar letters of reference indicate corresponding parts.

Referring to the drawing, E is a table, which supports a vat, C, for containing a solution of rubber or other vulcanizable substance. F is a movable frame, that is capable of sliding vertically through the table E. A support, B, rests upon the frame F, and has the socket *a* attached to its under side. In the socket *a* the molds or forms A are placed, so that when the support B rests on the frame F, the molds or forms A project downward into the rubber solution. The frame F is raised or lowered by means of the windlass G, which is arranged in the frame of the table. A cord, *b*, running from the said windlass over the pulley *c*, attached to under surface of the table, is connected with a cross-bar, *d*, in the lower part of the frame F.

D is a reservoir for containing a supply of the rubber solution, which is delivered through the pipe *e* to the vat C as the rubber solution in the vat becomes exhausted by dipping the molds.

The molds or forms A are made from glass, and are of the same form and size as the interior of the articles to be made. The forms or molds may be made from glazed porcelain, or other similar material.

The frame F may be raised and lowered by means of a screw instead of the windlass, or by any device that will move it uniformly.

In manufacturing the rubber articles I place the appropriate forms or molds A in the sockets *a*. I then take a quantity of rubber or other vulcanizable substance, and prepare it in the ordinary manner for vulcanizing, and then dissolve it in naphtha or other appropriate solvent, and place the solution so formed in the vat C and reservoir D. I then, by means of the frame F and windlass G, lower the molds A into the rubber solution in the vat C, and by the same means raise them out of the said solution and allow them to stand for a short time, and if the coating on the glass molds or forms is not of the required thickness, I lower them into the solution a second time, and repeat the operation until the coating has attained the desired thickness. I then remove the molds from the frame F, and if a bead or roll is to be formed around the edge of the article, as in the case of finger-protectors, nipples, and other similar articles, I roll the edges up on the mold until a bead of the required size is formed. I then place the molds or forms in a vulcanizer, and vulcanize the rubber in the usual way.

The advantages claimed for this method of working rubber are that articles are seamless, and have a finished exterior and interior surface. They can also be made much more rapidly than by the ordinary process. The glass form permits of readily removing the rubber after it is vulcanized, and it gives the surface of the rubber, which is in contact with the glass during the process of vulcanizing, a smooth and finished appearance. A further advantage consists in dispensing with molds for the outside of the article.

My invention is particularly applicable to the manufacture of finger-protectors, nipples, and other articles of that class.

I am aware that it is not new to dip a glass-former in fluid rubber, roll it off, and then vulcanize it in soap-stone or from hooks; but by dipping the former and vulcanizing the rubber thereon, the article is provided with a smooth face, that looks as if it had been polished, thus saving the subsequent labor and expense of the polishing process.

Having thus described my invention, I claim as new and desire to secure by Letters Patent—

1. The process of manufacturing articles of rubber, which consists in first dipping a glass former into the gum or rubber solution, and then vulcanizing them while still on the glass, as and for the purpose specified.

2. The combination of the table E, vat C, sliding frame F, support B, molds A, and reservoir D, substantially as shown and described.

3. The combination of the windlass G, pulley C, table E, frame F, support B, molds A, and vat C, substantially as shown and described.

CHARLES E. LONGDEN.

Witnesses:
    CHARLES HINE,
    GEO. HINE.